Oct. 24, 1933.　　　　G. H. FRASER　　　　1,931,533
AIR AND OTHER SEPARATOR
Original Filed Dec. 7, 1926　　4 Sheets-Sheet 1
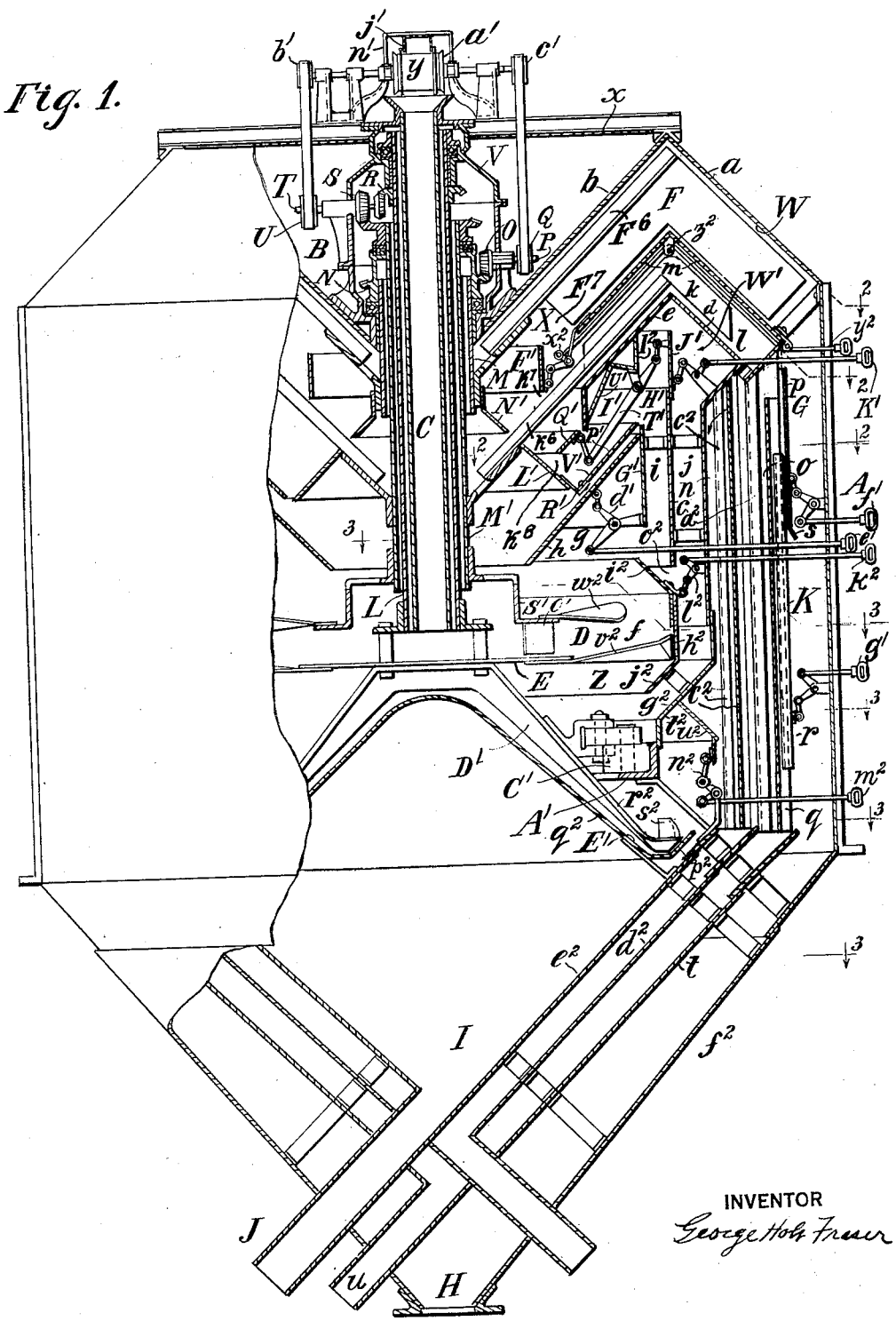
INVENTOR
George Holt Fraser Oct. 24, 1933.  G. H. FRASER  1,931,533
AIR AND OTHER SEPARATOR
Original Filed Dec. 7, 1926   4 Sheets-Sheet 2
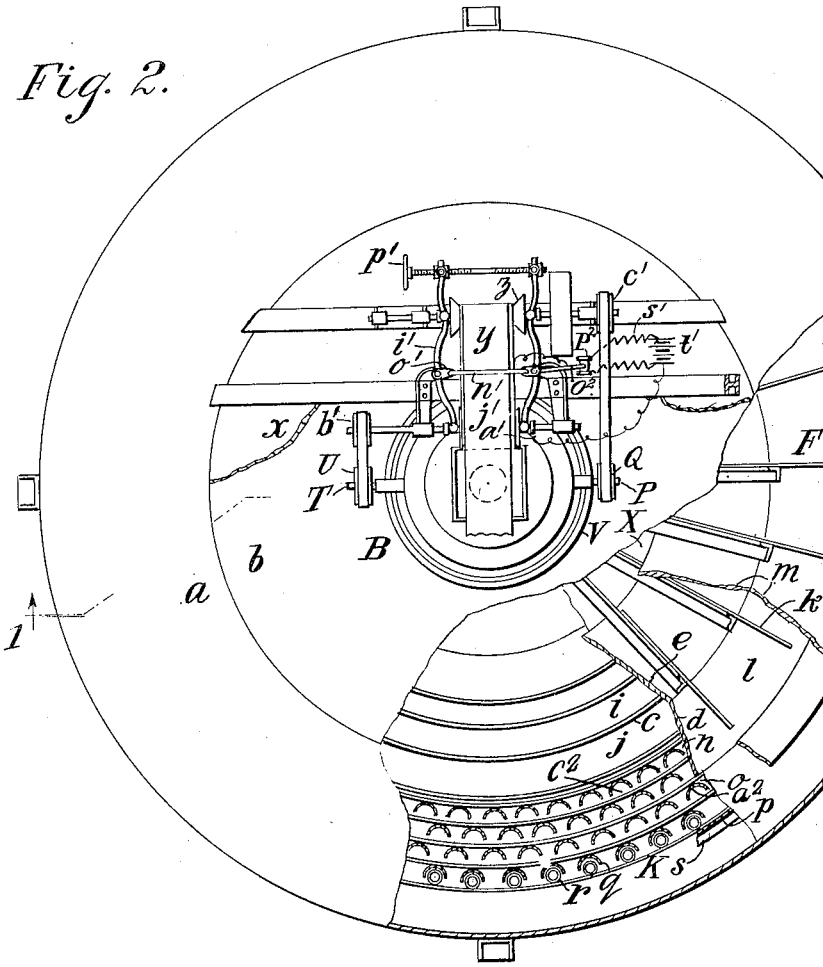
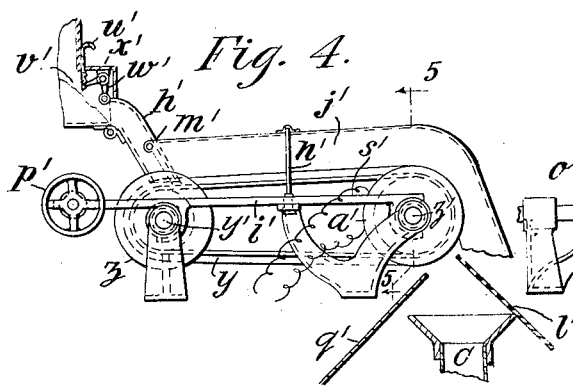
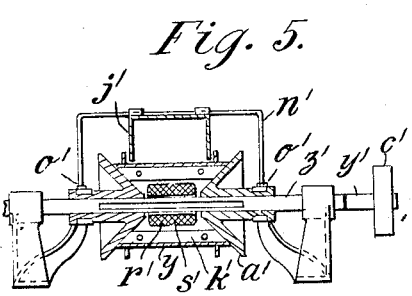
INVENTOR
George Holt Fraser

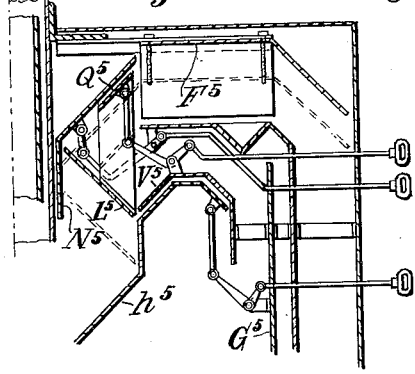
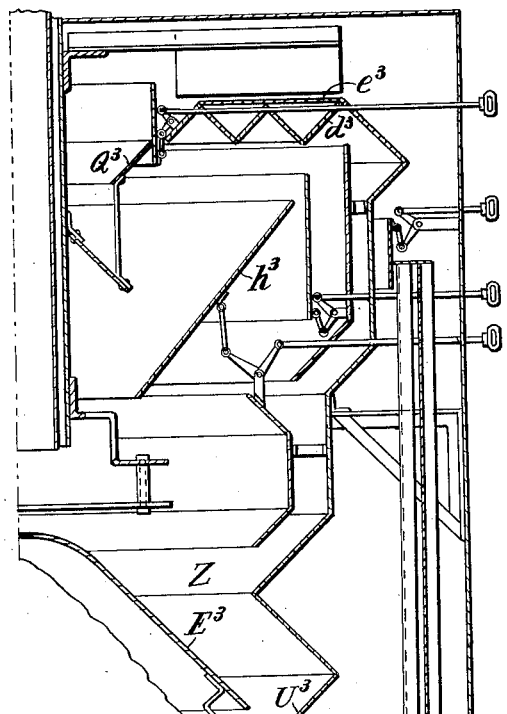
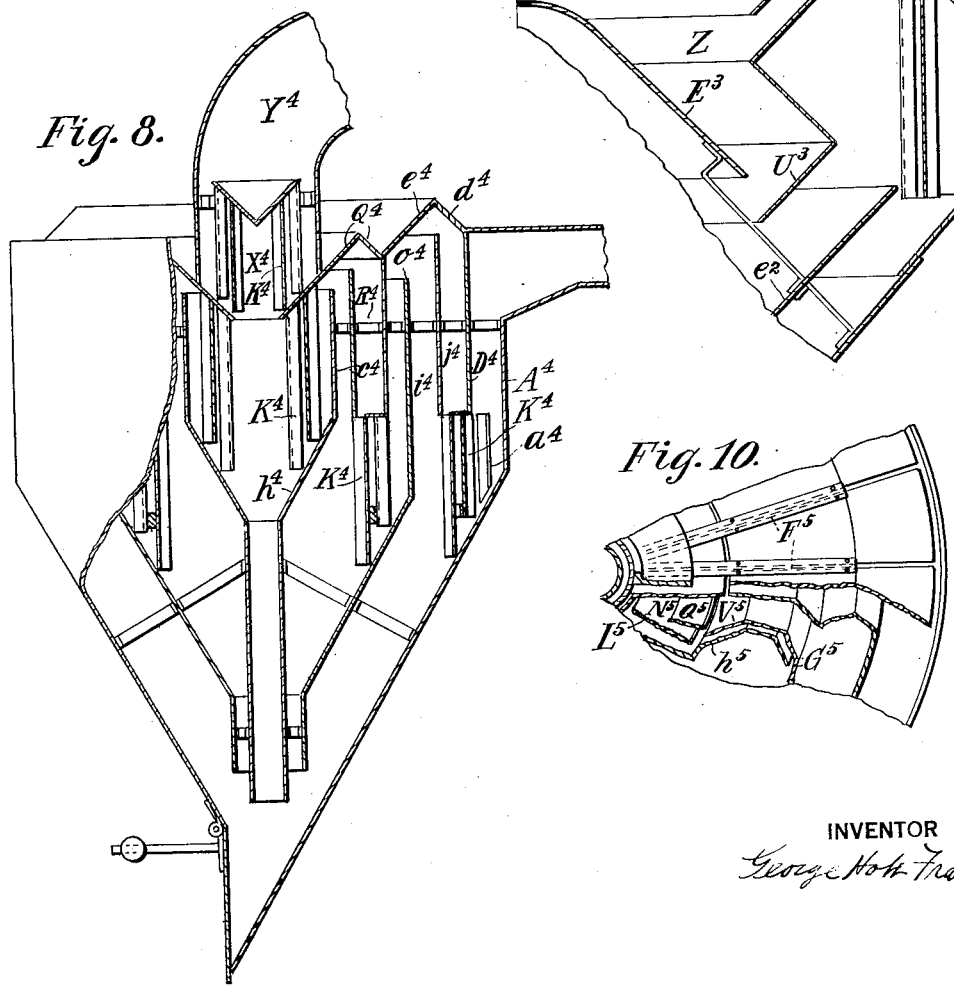
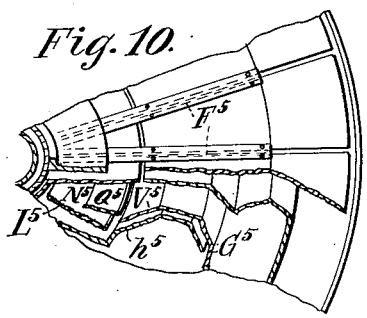

Patented Oct. 24, 1933

1,931,533

UNITED STATES PATENT OFFICE 1,931,533

AIR AND OTHER SEPARATOR

George Holt Fraser, Brooklyn, N. Y.

Application December 7, 1926, Serial No. 153,179
Renewed July 23, 1930

8 Claims. (Cl. 209—137)

This invention relates to fluid current air separators in which the current is used to separate fine from coarse material, and aims to provide improvements especially applicable to such devices.

Heretofore air separators have comprised a casing enclosing a chamber, a receptacle in said chamber having upper and lower openings communicating therewith, means for causing a fluid current to flow in the form of a vortex ring up through said receptacle and upper opening into said chamber and return through said lower opening, means for introducing pulverulent material to be separated by said current to permit it to float fine particles into said chamber and allow coarser particles to fall through said receptacle, adjustable means for distributing such material, means for varying such current for varying the fineness of the separated product, and means for intercepting particles floating in the returning current.

One such separator is shown in my Patent No. 1,834,095 dated Dec. 1, 1931, in which I have shown and claimed a rotary cylindrical valve carried by the blower and within the upper outlet, a vertically variable cross-chamber baffle wall below and adjacent the upper central outlet from the separating chamber, and having an outer periphery spaced from the outer wall of such chamber for defining a circuitous outlet extending from the outer portion of the separating chamber above said wall to said central outlet, said wall being spaced a substantial distance above the distributor to afford below it a substantial selection chamber, for precipitating coarse particles floating in the baffled current flowing toward such outer outlet, in which patent I have shown and claimed a flat flanged material retainer shelf across and spaced below the current inlet, for receiving and retaining unseparated material dropping through such inlet, and material tossers below such inlet for uptossing such retained material into the path of the current upflowing in such inlet, which shelf is shown as having a periphery so adjacent the inlet that such material will be retained substantially under the inner periphery of the inlet, and which tossers have been shown as extended only to adjacent the inner periphery of the inlet, for uptossing such material sufficiently adjacent such inlet to expose its fines to the current flowing into and upwardly through the inlet, instead of to that part of the current returning outwardly of the inner casing, and to toss coarse particles against the downwardly and inwardly inclined non-adjustable outer wall of the casing and deflect them outwardly and let them discharge by gravity between the periphery of the shelf and the tailings receiver.

My present invention aims to provide improvements especially applicable to separators of this character, and aims to facilitate regulation of the rate of feed to them, regulation of the current, agitation of the material to expose its fine content to the action of the current, extraction of oversize particles from the current before it passes to the outer chamber, classification of the separated product, and variation of the fineness of separation.

To this end in carrying out the preferred form of my present improvements I provide improved feed regulating and varying means, improved drive regulating and varying means, improved current generating means, improved current ways, passages and varying means, improved dust intercepting or filtering means, improved material agitating means, and improved casing construction and improved outlets for the separated products and I provide improved methods in vortexical ring separation.

Preferably I provide a variable speed belt feeder mounted on shiftable conical pulleys, which drive the revolving distributor from the variable speed one of these pulleys and the dust current blower from the constant speed one of these pulleys, to vary the speed of the distributor with the speed of feed while maintaining constant speed of the dust floating current;

Preferably I provide for passing a major current up through the separating zone, and for subsequently dividing such current into a minor current for floating out the fineness of dust desired and into an auxiliary current for the residue of the fluid constituting the major current, so that the major current is concentrated for separation and then divided or segregated for dust flotation through one passage and replenishment through another passage, which fluid currents or their passages are preferably respectively variable;

Preferably I provide for sub-dividing the dust current to vary the volume and force thereof subject to filtration by by-passing more or less of such current over through or under the filter or by varying the area of the latter to regulate the product it extracts;

Preferably I provide for deflecting the separating current inwardly under the baffle wall above the selecting space within the receptacle and above the point of initial distribution and separation, for compelling such current to flow outwardly in a circuitous path to reach the peripheral outlet around such wall, to facilitate precipitation of particles, and provide an upward outlet for the dust laden current to flow upward from such chamber and I preferably provide an annular open sided baffle wall spaced from and having its open side opposed to such upward current, for affording a currentless chamber in the direction of flow of such current, for deflecting such current and receiving particles floating in such current, and particle deflectors for deflecting outwardly large particles rising in such current, and again deflecting such particles downwardly through an exit around the feeding chamber;

Preferably I provide means for receiving the discharge from the primary feeding chamber and conveying such discharge outside of the lower inlet, and for retaining such discharge a substantial distance outwardly of the lower inlet, and for agitating or tossing it upwardly in the path of the returning current outside of the wall of the receptacle to expose the fines remaining in it to action of the returning current outside of the wall of the receptacle and toss oversize through this current, and I preferably provide an adjustable downwardly and outwardly extended deflector wall around the outside wall of the receptacle and above the outer tossers and above the outer returning current, for arresting and downwardly deflecting across the path of the outer current and into the tailings receiver oversize particles uptossed by such tossers, and dropping such particles into the usual tailings cone or coarse discharge, and I provide various other features of improvement, all of which will be hereinafter more fully set forth with reference to the accompanying drawings, in which Fig. 1 is a side elevation partly in vertical axial section of an air separator for availing of my improved methods and embodying the preferred form of my present improvements;

Fig. 2 is a plan view thereof partly in horizontal section on the planes of the lines 2—2 of Fig. 1;

Fig. 4 is a fragmentary side elevation of the variable feeder and its driving connections with the top of the separator;

Fig. 5 is a fragmentary vertical section thereof on the line 5—5 of Fig. 4;

Fig. 7 is a fragmentary section showing a modification of certain of my improvements as applied to a flat top separator;

Fig. 8 is a fragmentary view showing certain of my improvements as applied to a centrifugal dust collector;

Fig. 9 is a fragmentary vertical axial section showing a modification of certain of my improvements as applied to a flat top air separator, and Fig. 10 is a fragmentary plan view thereof partly broken away to show the internal parts in plan and broken section.

Figure 3:
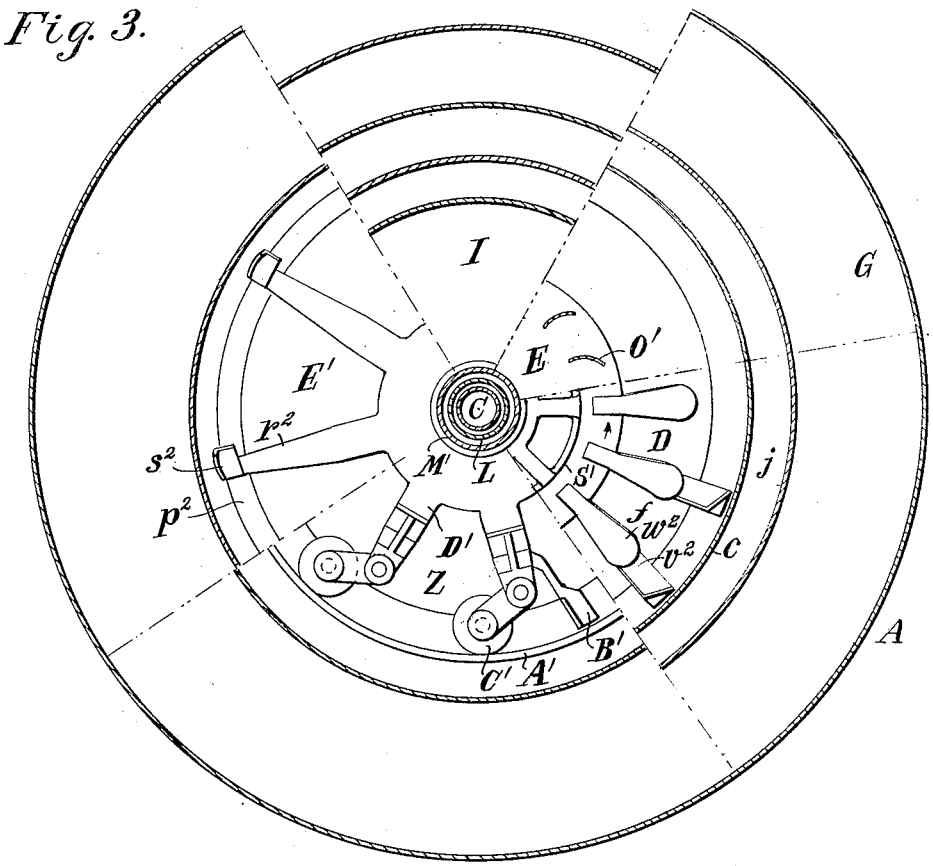
Fig. 3 is a horizontal section broken away on the plane of the lines 3—3 in Fig. 1.
Figure 6:
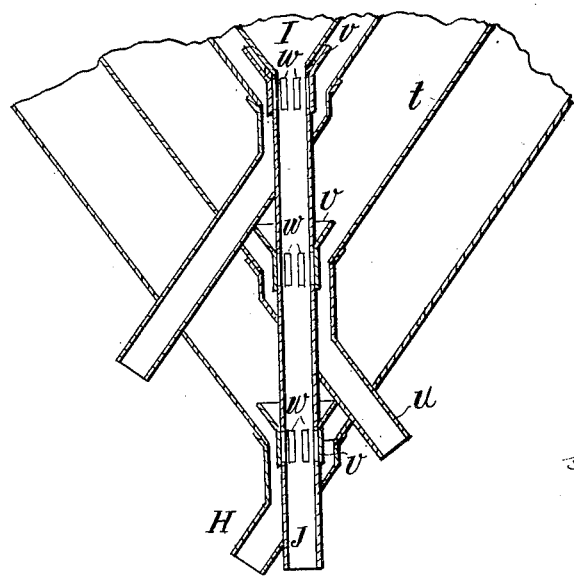
Fig. 6 is a fragmentary vertical section showing the valved outlets of the separator.

Referring to Figs. 1, 2 and 3 of the drawings let A indicate the main frame or casing of an air separator, B the driving mechanism therefor, C the feed supply or pipe for introducing material to be separated, D the feed casing or separating or feeding chamber, E the distributor therein, F the main fan or current means, G the outer settling or dust chamber, H the dust or fine outlet therefrom, I the tailings receiving and conveying chamber or receptacle, J the tailings or coarse outlet therefrom, K the foraminous filter or current cleaning means surrounding the feed chamber, L the drive shaft for the distributor, M the drive shaft for the main fan, N the drive gear for the main fan, O its drive pinion, P its drive shaft, Q its drive pulley, R the drive gear for the distributor, S its drive pinion, T its drive shaft, U its drive pulley, and V the gear frame or drive casing, of an air separator. These parts may be of any suitable construction for distributing pulverulent material in the feed chamber and causing a fluid current to rise through it to float fine material into the outer chamber, to facilitate which a small space W in which the fan revolves is provided above the distributing chamber and beneath the top wall of the main casing, an upper current outlet X communicates between the distributing chamber and this fan way, a return current passage Y communicates between the outer chamber and the tailings cone, and a lower opening Z affords entrance of the return current to the distributing chamber below the distributor.

In such separators the current rising through the fed chamber separates fine material in a relatively contracted separating zone or space opposite the distributor and raises it to a relatively expanded selecting space above the distributor where some of the oversize material may precipitate as the current rises to the outlet X, and the fineness of the dust carried through this outlet depends on the speed of the current in the selecting chamber, which may be varied by varying the space through which the current may flow or by varying the speed or dimensions of the blower, or by both variations. Such variation correspondingly modifies the volume of current in the separating chamber opposite the distributor and thereby effects its separating capacity, thus varying separating efficiency with variations in fineness of product.

In such separators the entire separating current has passed through the filter thus making the filter extracted product depend on the force of the dust floating current and varying such product with variations in such current.

My present improvements aim to provide a forcible separating current, a suitable dust carrying current, a moderated filtering or cleaning current, and for varying these to suit desired results, with the object of effecting efficient separation while maintaining suitable fine floatation and permitting uniform filtration extraction.

I also aim to improve the construction and operation and arrangement of the separator.

Referring to Figs. 1, 2 and 3 I will now describe in detail a preferred embodiment and use of my improvements as therein shown;

The casing A preferably has a cylindrical side wall, a conical bottom wall, an outer annular tapering curved or conical top wall $a$ rising from its side wall and an inner annular curved or annular downwardly inclined or conical top wall $b$ affording a center recess or cavity above it and an annular outer curved or reversely outwardly inclined top wall for the fan way W within it. The casing encloses the chamber G in which the feed chamber D is mounted concentrically and in spaced relation to said outer and upper walls.

The feed chamber D preferably has a cylindrical side wall c, annular reversely inclined or tapering top walls d and e spaced from and preferably parallel with the top walls of the casing A and affording bottom walls for the fan way above it so that this way is sinuous in its outward extension in the space between these opposite walls.

The blades F are preferably shaped to correspond with the cross sectional contour of the fan way W, as by being made of L shaped plates as shown, and are revolved by their tubular fan shaft M at the speed requisite to give the desired dust floating current up through the upper outlet X and down into the dust chamber G.

Blade carrying means F6, preferably as upwardly and outwardly extending inclined spaced spokes extending through and above the upper outlet X, connect the blades F with their drive shaft M, and preferably according to one feature of my invention the blades F are mounted at their upper edges on and have free lower edges depending from the spokes, and the inner edges which project vertically and downwardly from the spokes a distance exceeding a major portion of the width of the blade, so that under the spokes and inwardly of the inner edges of the blades they afford a clear annular valve chamber F7 above the outlet X and encircling the upwardly projecting spokes and encircled by the inner edges of the blades.

The distributor E is preferably mounted in the lower part of the casing D and is vertically adjustable on and revolved by its tubular driving shaft L, which is spaced within and extends concentrically through the blower shaft M. The distributor centrifugally projects material to be separated outwardly in a film across the separating chamber $f$ in the lower part of the casing D, and the current returning from the chamber G through the return passage Y and rising through the lower unseparated material dropping opening Z flows up through this distributed material to float fine particles upwardly therefrom into the selecting chamber $g$ above the distributor.

Preferably according to another feature of my invention I provide an upwardly and outwardly inclined or conical inner and top wall for the selecting chamber $g$ which is preferably a vertically variable wall $h$ to vary the volumetric area of this chamber, and at its upper edge spaced from the side wall c to afford a narrow upward outlet $i$ for the dust laden current, above and opposed to and spaced from which outlet I preferably provide an open sided annular baffle wall 12, affording a relatively currentless chamber for banking air in the path of such current, to deflect such current toward the upper outlet X, and to receive particles rising in such current, which current is projected upwardly and curves inwardly to reach the upper opening X, and in so doing impinges against the inclined walls d and e against which the rising air banks to afford an air dam or dead space for guiding the current around inwardly from the outlet $i$ to the outlet X. Large particles in such rising current will penetrate this bank of air and impinge against the inclined wall e at an angle of incidence which will cause them to be self deflected outwardly against the reversely inclined wall d at an angle of incidence which will cause them to be self deflected downwardly into the annular grit receiving and collecting chamber W' which is opposite to and in open communication with the hollow or dead space under the deflecting wall e and d and in juxtaposition to them to receive and collect such deflected particles, while the finer particles light enough to float with the inward whirling current will be carried with it instead of penetrating such air bank, and will be floated to the outlet X while larger particles have been thus mechanically extracted by deflection as just described.

To remove and conduct downward such deflected particles, preferably according to another feature of improvement, my invention provides an annular way or passage $j$ without and around the casing D for receiving particles deflected from the wall d and conducting them past and below the distributing zone to where they will not be molested by the separating current.

Thus my invention provides what may be termed a dead air space in the circuitous path of the current escaping from the feed chamber in which the banked air affords a void into which oversize may pass as the dead air affords an air wall for guiding the main current laden with finer dust to the outlet, and provides for impactively projecting any large particles penetrating the dead air in such space through the current void such space affords a space or chamber W' where they may be free from the separating current, and for conducting them outwardly and downwardly into a by-pass for passing them by the distributing zone. Necessarily such a by-pass affords also a relief passage for some of the banked current and also by-passes it to below the distributing point, but no loss need necessarily result from this since the by-pass current is re-introduced to the returning current at the return passage Y or the lower outlet Z or opposite the separating chamber or immediately under the distributed film so that it affords an auxiliary inward and upward separating current supplementary to and amplifying that returning through the passage Y, whereby the volume of current in the separating chamber is the sum of the dust floating current flowing through the fan way W and the by-pass current flowing through the grit way $j$ thus giving the benefit of the full current for separation and a fractional current for dust flotation.

Preferably according to another feature of my improvements my invention provides for independently supplementing the main current for affording a multiplied current through the separating chamber without necessarily amplifying the dust floating current, and this I preferably accomplish by providing a supplementary or additional blower $k$ preferably above the selecting chamber and below the main blower, and which revolves in an additional fan way $l$, the lower walls of which are the inclined walls d and e and the top wall of which has a reversely inclined wall $m$, which way communicates with and discharges into the by-pass $n$, so that as the blower $k$ revolves it takes current from the top of the chamber D and forces it down through the by-pass to beneath and into the separating chamber $f$, thus adding this auxiliary current to the main current to afford a correspondingly increased current through the distributed material without requiring flowing of such current through the dust floating passages.

Thus combining the two currents at the separating point and segregating them at the dust floating point facilitates efficient separation without hazarding uniform flotation. The secondary fan $k$ is preferably differently revolved at variable speed by its tubular shaft $M'$ concentric of and running between the shafts L and N.

Revolving blade carrying spoke means, preferably as upwardly and outwardly inclined spaced spokes $k6$, mounted at their lower ends within the chamber D and extending up through its upper outlet X and revolving in the space between the inner casing D and outer casing A, and affording between the edges of such spokes passageways for the outflowing separating current, connect the blades $k$ with their revolving shaft $M'$, and preferably the blades $k$ are mounted near their lower edges on the spokes $k6$ and project vertically throughout the rest of their width above these spokes, and have upwardly extending inner edges encircling the space above the inclined spokes $k6$ and afford inwardly of such edges and above said inclined spokes an annular spoke encircled and inner fan blade edge encircled valve chamber $k7$ through which the separating current may flow from the separating chamber to the fan blade $k$, and afford below the inclined spokes $k6$ an annular spoke encircling valve chamber through which such current may rise to reach the fan blades $k$.

My invention preferably, according to another feature of my improvements, provides for sub-dividing the dust floating current to vary the force and volume thereof passing through the filter K and modifying the entire volume of such current, and this is preferably accomplished by variably by-passing more or less of such current around the filter, and by varying the effective filtration area of the filter itself. Preferably I provide a by-pass $o$ surrounding the by-pass $n$ and communicating with the dust chamber G immediately under the fan way W, past an adjustable valve or damper $p$ so that more or less of the relatively clean air at the inside of the fan way may be released through this by-pass directly to the return passage without going through the filter K. Preferably also I make the filter K of two rows of half round staggered troughs $q$ with their hollow faces opposed to the inflowing current to afford current voids in which dust may precipitate as the current flows around the dead air banked in these voids to escape between the spaced edges of the troughs, and in each trough I mount a vertically adjustable wall $r$, as a tube or cylinder fitting the trough to eliminate corresponding portion of its hollow face by affording a smooth front wall past which the air may freely flow between the lower ends of the troughs to facilitate its non-resistant escape from the dust chamber to more or less extent according to the vertical adjustment of these tubes, the upper ends of which are joined by a deflecting shield $s$ around it which the air must pass to enter between them, to prevent dust being sucked through with it. Thus it is permitted to pass more or less current through the filter K without diminishing the total of the dust carrying current, so that while dust carried over by it may precipitate in the chamber G and escape through the coarse dust cone $f2$ to the dust outlet H, a finer and regulated dust may be extracted by the filter K and withdrawn by going through the fine dust cone $t$ to the fine dust outlet $u$, and regulation of the fineness of this dust can be varied by varying the valve $p$ or the valve $r$.

To return to the tailings any dust precipitated in the chamber G my invention preferably provides a valve $v$ closing slots $w$ in the tailings pipe when elevated and opening these slots when lowered and then connecting the dust cone to discharge directly into the tailings pipe.

The gear frame or drive casing V is preferably disposed in the recess or cavity afforded by the inner inclined top wall $b$ of the casing A, and an annular cover $x$ surrounding the gear frame and mounted on the casing affords a removable closure for this cavity in the construction shown.

Preferably the feed pipe C is non-rotary and is stationarily supported on the gear frame and extends through the distributor drive pipe L and opens at its lower end opposite and above the distributor to feed material to be separated thereto by gravity.

According to one feature of my invention preferably speed of feed of material to the feed pipe C is regulated by a variable speed feed belt $y$ running over axially adjustable conical driven pulleys $z$ and running on axially adjustable conical idler pulleys $a'$, the speed of the feed belt varying with the position of its driven pulleys and its speed of feed consequently varying with its speed of travel, so that the quantity feed to the separator can be accurately gauged.

According to another feature of improvement my invention preferably varies the speed of drive of the distributor E and of the secondary fan $k$ with the speed of feed, as by driving with the variable speed cone $a'$ of the belt from a pulley $b'$ on the idler shaft of the belt $y$, and provides for driving the dust current fan F at regulated speed by driving it from the pulley $c'$ on the constant speed pulley shaft of the belt $y$.

The bellows-like partition or wall $h$ is preferably suspended from a bell crank $d'$ operated from without by a handle $e'$ for vertically varying this partition which slides on the fixed wall $G'$.

The valve $p$ is preferably vertically adjustable by a handle $f'$, and the valve $r$ is preferably vertically adjustable by a handle $g'$.

A gated spout $h'$ hinged to follow the variations in height of the belt $y$ feeds the material to be separated on to this belt at a speed coincident with the surface speed of the belt as the latter drags it away from the spout, and it is continuously discharged by the belt into the feed pipe in a uniform stream. The conical pulleys for the belt are connected by pivoted levers $i'$ to oppositely shift them to maintain tension of the belt as its speed is varied and the edges of the belt are flanged to avoid spill of material sideways thereof, it and its hopper connection and feed pipe being enclosed by a casing $j'$ to prevent escape of dust.

Preferably the variable feed belt $y$ is of rubber composition and has vertical edge flanges on its outer face for preventing escape of material, and is superposed on a running belt $k'$ preferably made of links or sections having bevel end edges corresponding to the conical taper of the axially adjustable pulleys on which it runs. The dust cover $j'$ has depending edges fitting between the flanges of the dust belt to afford an enclosed conduit above this from the spout $h'$ to the point where the belt delivers material to be separated on to the scalping screen $l'$ above the top of the separator. The end edges thus protect the segmental belt from injury or clogging by the material, and its flexible yielding flange contacting with the dust cover affords a complementary part of an enclosed dust conduit which is flexible or movable to follow adjustments of the belt, to permit which the cover $j'$ is hinged at $m'$ to the hinged spout $h'$ so that each can swing to adapt itself to the feed belt.

To automatically shift the cover and spout and relieve the belt of their weight my invention perferably connects them by arms $n'$ on to lugs $o'$ on these levers from which they are sustained and by which they are moved as the speed of the belt is varied by shifting the levers from their shifter $p'$.

The belts $k'$ and $y$ are preferably nonmagnetic, and my invention preferably provides a magnetic separator within them adjacent to their discharge portion for magnetically attracting iron objects on the belt and retaining these until they have passed the feed pipe to the separator and then dropping them on an iron chute $q'$ as the lower part of the belt travels out of the magnetic zone, which is preferably accomplished by surrounding the outer pulley shaft with oppositely cup shaped cylindrical steel thimbles $r'$ around which and between their adjacent flanges is disposed a magnetic coil $s'$ the terminals of which are connected with a source of electricity or a generator $t'$ which energizes the opposite poles of the magnet adjacent to the inner wall of the belt and should be suitably constructed and proportioned and energized to exert sufficient magnetic attraction through the traveling belt to retain thereon any highly magnetic material until it has passed the feed pipe and traveled with the under side of the belt sufficiently out of the magnetic field to be released and dropped on to the iron chute. As the lower side of the belt travels from the magnet and out of the magnetic field the magnet can be stationary and need not require switches or a commutator as its north and south poles can be continually magnetized without preventing release of material from the under side of the belt as it leaves the magnetic zone.

My invention provides for automatically varying the speed of feed to the variable feeder as the speed of the latter is varied, preferably by interposing an adjustable gate $u'$ and opposite supply hole $v'$ and operating this gate by a bell crank $w'$ hinged under the cover of the feed box $x'$ so that its lower end will be operated by the swing of the spout $h'$ to close the gate as the spout swings downward to suit the slower moving position of the driven end of the feed belt and to open the gate as the spout swings upward to suit the faster moving position of the driven end of the belt, so that inlet of feed will automatically vary to suit the speed of the feed belt as its speed is varied by shifting the cone pulleys on the driving shaft $y'$ and driven shaft $z'$ of the feed regulator.

Preferably filtering or air cleaning means $a2$ are provided for the air returning through the dust current relief vent $o$, which discharge their extractions into the intermediate or fine dust cone $t$, and filtering means $c2$ are provided in the by-pass $n$ for returning the blast currents which discharge their extractions into a fine cone $d2$ these cones being between the inner tailings cone $e2$ of the tailings chamber I and the outer cone $e2$ of the chamber G, and each being dust cone $f2$ of the chamber G, and each being provided with a sliding conical valve $v$ for opening communication between it and the valve openings $w$ of the tailings pipe to permit feeding from any of these cones to the tailings pipe when such valve is opened or separate withdrawal through the regular outlet of these cones when such valve is closed, which permits observation of the fineness and quantity of dust being carried through any by-pass, and separate utilization of any such dust, or the return of any of it to the tailings, such filters preferably extending the full vertical length of such return passages to afford great area for return flow of the current while it is being filtered.

My invention, according to another feature of improvement, preferably provides for impactively breaking up balls or lumps of agglomerated material, and for pressure pulverizing oversize or grits below the separating chamber $f$ and the distributing disc E, which is preferably accomplished by providing an annular die or anvil shelf ledge or ring A' spaced below the conical bottom wall $g2$ of the grit conduit $j$, so that descending grit will lodge on this shelf and balls or lumps of adhering material descending from the selecting chamber will lodge on it, and by providing revolving scrapers B' for agitating disintegrating and removing such material and plowing it in front of centrifugal crushing rolls C' by which it is pulverized against the die A' from which it drops into the returning current. The rolls and scrapers are preferably revolved by arms D' connected to the revolving disc E. Thus any material descending from the separating chamber or from the grit selector is subject to disintegration and pulverization and dropped into the rising air current, by which its fines may be raised to the separating chamber for separation and further selection.

My invention, according to another feature of improvement, preferably provides for adjusting the volume or area or contour of the separating chamber $f$, preferably by providing it with a cylindrical outer wall $h2$, a vertically adjustable inwardly inclined upper wall or deflector $i2$ and a vertically adjustable inwardly tapering lower wall or deflector $j2$, by varying which the area and contour of the separating chamber can be modified to vary results. The wall $i2$ is preferably adjusted by a lever $l2$ operated from without by a handle $k2$ and the lower wall $j2$ is preferably varied by a lever $n2$ operated from without by a handle $m2$.

The upper wall $i2$ serves to deflect the current rising through the separating chamber inwardly into the selecting chamber $g$ so that it flows upwardly and outwardly under the inclined wall $h$ and makes a downward curve around the fixed wall G' as it enters the vertical blast passage $i$, down which curve large particles are thrown downwardly on to the top of the deflector $i2$ down which they descend to a particle outlet $o2$ communicating with the grit duct $j$ through which they descend to the pulverizer ledge A'.

My invention, according to another feature of improvement, preferably provides for subjecting any material falling from the separating chamber to agitation and selection outside of the outer wall of the separating chamber and in the concentrated inwardly flowing return current to enable this to extract any fine material and return it to the separating chamber before the rest of the material escapes into the tailings cone, and this I preferably accomplish by placing a pan or receptacle E' below and extending a substantial distance outwardly beyond the lower inlet of the separating chamber and in the upper part of the tailings chamber for receiving descending material, and conveying and retaining such material outside of the outer wall of the separating chamber and below the zone of the inwardly returning current. This pan preferably has an annular flanged edge p2, affording an annular retainer trough a substantial distance outside of the lower inlet and spaced from and supported by the tailings cone e2 to permit coarse material to descend around it, inwardly of which the pan has a conical deflector or wall q2, affording a gravity conveyor for conveying such material outside of the lower inlet and for directing descending material on to its flange, above which wall are revolving arms or spokes r2 affording conveyors or pushers for facilitating outflow of such material from inwardly of to outwardly of the lower inlet, preferably mounted on the bottom of the disc E and carrying on their outer ends plows, stirrers or tossing scoops s2, disposed a substantial distance outwardly of the lower inlet which as they revolve scrape the material from the trough p2 and violently project it vertically outwardly and around the outer wall of the separating chamber and through and across the inflowing returning current with sufficient force to impel large particles through the current and against an outwardly inclined deflecting wall t2 of such inclination that the angle of reflection of such particles impelled against it will cause them to fly outwardly against a reversely inclined deflecting wall u2 without and around the separating chamber and of such inclination that the angle of reflection of such particles deflected against it will cause them to fly vertically downwardly through the returning current and into the upper open end of the tailings cone e2 so that only particles of sufficient size to be thus deflected across such current will be capable of escaping through it to the tailings cone and thus be cut out of the endless air circuit while all particles fine enough to be floated with the current will be returned to the separating chamber and circulated through the selecting or grit extracting chambers or passages and the disintegrating and pulverizing elements until they are eventually separated as fine dust or cut out through such deflection.

The pan E' is preferably carried on the lower removable sections of the lower cones and the die A' is preferably carried on the upper sections of these cones, so that the pan can be lowered with such removable sections to give access to other internal parts without disturbing these.

My invention, according to another feature of improvement, preferably provides for vertically adjusting the grit deflectors t2 and u2 to vary their relation to the pan E' and to vary the air space between them and such pan by which returning current may pass to vary its velocity at that point, which is preferably accomplished by sustaining these deflectors from the lever n2 which sustains the lower wall j2 of the separating chamber which is preferably mounted on it in spaced relation to afford suitable outlet for the grit duct j between these parts, which walls are telescoped on one another and movable vertically relatively to the die A' to permit the described adjustments.

My invention, according to another feature of improvement, preferably provides beater fan blades v2 revolving with and spaced below the distributing disc E and current impelling revolving fan blades w2 spaced above and revolving over this disc, so that material centrifugally projected from the disc is agitated and impelled upwardly by the lower blades and the material laden current rising through the separating chamber is impelled upwardly into the selecting chamber. The blades v2 have inclined edges which scrape the wall h2 to toss inwardly into the rising current any material lodging on this wall.

For varying the spaces through which the dust current and blast current may pass, according to another feature of improvement, my invention preferably provides a valve or valves, preferably as an annular inclined spoke encircling and encircled fan blade encircled variable or vertically adjustable valve F' below and encircling the spokes f6 and above and encircled by the spokes k6 and inwardly of the inner edges of the blowers F and k, which may be raised to diminish dust current and increase blast current passages or lowered to increase the dust current passage and diminish the blast current passage by the tilting lever x2 operated from without by a cord y2 running over a sheave or pulley z2 above the fan blades k, and has an annular or inclined or conical valve Q' preferably below and encircling the inclined spokes k6.

Preferably, according to another feature of improvement, an annular vertical wall G' surrounding and preferably depending below and slidingly guiding the bellows h causes the air rising thereunder to whirl downward on its way to the passage i and affords an inner wall for the passage making the latter a contracted annular passage through which the current rises in a vertical blast. The deflecting walls e and d afford beneath them a concave troughlike hollow or space H' around the baffle wall 12 and opposite and opposed to and spaced from the passage i and in the path of its rising current in which part of the air is pocketed and remains as a comparative calm affording an air wall for guiding the remainder of the air current around the upper edge of the baffle h to the inwardly extending suction passage I' leading to the intake chamber X at the edge of the fan and relatively large particles carried by the blast rising through the passage i penetrate this air wall or dam and impinge against its upper wall at an angle of incidence such as to cause them to travel or be deflected outwardly and downwardly and into the grit passage j, while relatively fine particles having less momentum curve inwardly with the inflowing current and enter the passage I'. This permits segregation of particles according to size and weight successive to and supplementary to the selection effected in the selecting chamber g, which segregation may be varied, adjusted or controlled by the valve J' operated from without by the handle K', which also controls the amount of air which may escape through the grit passage, which being returned below the separating chamber f acts as an auxiliary blast current supplementing the separating current so that there is no current loss by reason of this arrangement for extracting and by-passing the grit.

To avoid a large chamber in which fines might settle above the bellows h, and to afford an approximately circuitous continuation for the passage I', according to another feature of improvement, my invention preferably provides an inclined partition L' which preferably is carried by and revolves with the spokes of the fan k and serves as a revolving lower inward wall for the passage I', and preferably I provide a cylindrical and outwardly flaring inner wall N' mounted on and revolving with the blower F and serving as an inner wall for the suction chamber X so that air circling from the passage I' through the blower F describes a large curve opposite the concave side of which is an inlet opening for the blast blower k, which has the advantage that dust carried by the circling air is centrifugally carried away from the inlet to the blast fan so that the blast current may withdraw a substantial portion of the air while returning only a minimum amount of dust.

The magnetic separator is preferably adjusted to vary its magnestim with variations in the depth of material or position or speed of the feed belt y, as by varying the electric current traversing its line s' in any suitable manner as by the switch $O^2$ operated by the movement of one of the levers i' to vary the resistance $P^2$ with variations in positions of such lever.

In operation the gate u' will be adjusted on its lever w' to permit the desired inflow of material at a predetermined speed to the feed belt y, and afterwards will be varied by movement of such lever incident to movement of the spout h' as the latter adapts itself to variations of the speed of this belt. Large pieces coming from the belt will be scalped out by the scalper l' and iron will be magnetically separated and withdrawn by the chute q', and the residue as feed will enter the air separator through the feed pipe C and be distributed by the distributing disc E which will centrifugally project it in a wide thin film or blanket across the separating chamber f. The agitating paddles below this film toss and stir the material, and the concentrated air current rising through the separating chamber will extract fine particles and lift them into the selecting chamber g, which will be varied by adjusting the height of the bellows-like partition h to vary the volume and speed and carrying power of the current, which will whirl downwardly around the wall G' and turn upwardly and rise through the dust blast passage i. Coarse particles in the selecting chamber g will be thrown by gravity or centrifugally on to the ledge of the deflector l2 and pass through the outlet o2 into the grit passage j surrounding the selecting chamber and be conducted past and without the separating current and be discharged below the separating chamber.

The dust blast will impinge against the air confined in the trough H' and will be curved inwardly into the passage I', while particles large enough to resist this change of direction will penetrate such confined air and impinge against the walls e and d and be deflected into and fall through the grit passage.

The remaining dust laden air will sweep in a curve through the passage I' and suction chamber X to the dust fan F in such manner that the dust will tend centrifugally to avoid the intake of the blast fan k.

The fan F will blow the dust therefrom into the dust chamber G and the blast fan k will extract and blow relatively clean air into the blast by-pass n from which it will return through the filter c2 to the return passage Y.

The successive relative inclination of the walls b and a and the cylindrical outer wall of the casing afford approximately a curved way for the rust laden air blown out by the fan F, so that the dust carried thereby tends centrifugally toward the outer wall of the dust chamber G down which it may fall to the dust cone f2.

The inner wall of the chamber G is preferably a foraminous filter K through which the air may return to the return passage Y, its speed of flow through the filter being varied by varying the filter area by the valve r.

The proportion of the dust laden air entering the chamber G may be varied by adjusting the valve p to let more or less air by-pass the filter K and return through the passage o and through its filter a2 to the return passage Y. This permits controlling the amount of the dust laden air passing through the chamber G while utilizing the rest of it in the air circulating system.

Any dust filtered from any of the segregated currents is preferably separately withdrawn by the corresponding dust cone under such filter, and used either as an isolated product or subsequently merged with other extractions according to the adjustment of the respective valves v.

The several return currents are preferably merged in to one combined current as they enter the returned passage Y, which passage is variable by adjusting the wall u2 above it to vary the intensity of whirl and inward speed of flow of the return current.

Grits, and any lumps or balled material descending around or through the separating chamber slide on to the anvil ring A' are subjected to disintegrating impact and pulverizing pressure by the elements B' and C' and scraped off into the lower opening Z of the feed chamber, where they fall through the return current which lifts fine dust from them and permits the residue to fall on to the pan E' and slide down its conical wall to its ledge p2 affording a lower wall for and below the returning current. The revolving plows s2 scoop the material from the pan and toss it upwardly across the returning current so that the latter may extract any remaining fines from it, and particles large enough to be thrown through the returning current may enter the trough like hollow spaces above the return passage and beneath the walls t2, u2 and may be deflected by these outwardly and downwardly and again through the returning current and into the open upper end of the tailings cone e2, by which such grit may be cut out of or extracted from the machine if it is coarse enough to resist the action of the concentrated inwardly flowing return current.

The outer walls of the separating chamber f will be varied to vary its area or to vary their relation to the distributor by varying the vertical position of the walls i2 and j2, and the baffles v2 and lifting blades w2 will be bent, twisted or oscillated relatively to the horizontal and relatively to their longitudinal axis to more or less agitate the material and the dust laden current and impel these upwardly.

Variation of the relative proportions of the effective area of the intakes to the dust fan F and blast fan k will be made by adjusting the valves Q' or F', and then the fan F will be driven at constant speed by the pulley c' on the drive shaft y' to the feeder, and the distributor E and blast fan k will be driven at variable speeds corresponding to the speed of feed from the pulley b' on the driven or variable speed shaft of the feeder, so that the faster the feed the faster will be the speed of the blast fan and distributor and the dust fan will maintain a constant speed suited to the dust carrying current desired, and the extra air required for separating increased feed being thus supplied by the blast blower without affecting the dust carrying force of the dust current.

Revolving with and spaced from the partition L' I preferably provide a reverse partition P' serving as a bottom wall for the passage I' to preserve uniform area for this passage independently of vertical adjustments to the bellows-like adjustable partition $h$, and opposite the partition P' I preferably provide a vertically adjustable inclined deflector Q' around and below the fan throat X and which receives impingement of coarse particles and deflects them downwardly across the current and on to the walls L' and P' so that they can pass through the space between these walls and into the inner or supplementary grit passage R' afforded by this space and the space within the partition $h$ and the space through the spoked hub of the agitator O' to return to the feed disc E. The bellows-like or adjustable partition $h$ surrounds the cylindrical wall S' of the agitator O' which affords an inner wall for the bellows-like or adjustable partition $h$. The movable deflector Q' is moved by a lever T' from and in opposition to movement of the valve J' of the outer grit deflector and slides vertically on a stationary intermediate annular deflector U' fastened on the top wall $e$ and having a cylindrical outer wall affording an inner wall for the pocket H' and a cylindrical inner wall affording a guide for the valve or deflector Q' and an intermediate bevel portion affording the deflector U'.

Preferably the air separator is built concentrically of and surrounding the feed pipe C and its various walls are annular, and all parts may be shaped and relatively proportioned to best suit the particular work for which use of my improvements is desired, and will be suitably supported one from another as circumstances may dictate. The walls will be sectionalized and have relatively removable portions to afford suitable access to the interior, and the various parts will be separably connected for facilitating their removal.

According to another feature my invention provides improvements in methods of vortexical ring fluid current separation, which preferably consists according to one feature of improvement in circulating fluid upwardly and downwardly in an endless path in the form of a vortex ring, supplying material to be separated in the upleg of such path, floating separated material upwardly in such path, dropping unseparated material downwardly out of such path, and tossing such dropped material back into such path, for separating from such dropped material, material fine enough to float in such current, and withdrawing coarser material below such path; and according to another feature of improvement in dividing a downwardly flowing portion of such separating fluid into separate down-flowing legs communicating with such upleg above and below the separating zone, for directly returning a portion of such circulating fluid and indirectly returning the remainder, and combining such divided portions below the separating zone for concentrating such fluid upflowing past such zone; and according to another feature of improvement includes differentiating the speed of flow of such divided currents and removing fine material floating in the slower flowing current; and according to another feature of improvement preferably consist in dropping the coarser material down the upleg of the separating current, and pulverizing such dropping material intermediate the up and down legs of the circulating separating fluid and inwardly of the circulation of such vortex ring, and according to another feature of improvement preferably consists in self outwardly and downwardly deflecting coarser material by utilizing its own momentum to carry it through a currentless air bank and deflect it outwardly and downwardly intermediate the up and down legs of the circulating fluid and returning such deflected material into the circulating fluid below the separating zone to refloat down-passed fine material and drop coarser material through the separating current.

It will be seen that my invention provides improvements which can be variously and advantageously availed of in whole or in part, and it will be understood that the invention is not limited to the particular details of construction, arrangement, or combination of parts, set forth as embodying its preferred form, since it can be availed of in whole or in part according to such modifications as circumstances or the judgment of those skilled in the art may dictate, without departing from the spirit of the invention.

In the modification shown in Fig. 7, the bellows $h3$ discharges directly toward the deflector $d3$, and the top wall $e3$ is flat and the inner deflector Q3 depends adjustably on it. The grit is cut out in this construction by dropping through the lower opening Z on an inclined deflector E3 by dropping across the returning current from which it is deflected across the returning current against a deflector U3 from which it again is deflected across the returning current on to the tailings cone $e2$, thus causing the discharge to zig-zag back and forth across the returning current to enable the latter to extract any remaining fines in it.

In the dust collector modification shown in Fig. 8 the dust laden current enters the casing A4 tangentially and revolves in it to centrifugally extract dust in the usual manner, whirling in the annular space between the inner wall of the casing and the depending annular wall D4, below which the current passes inwardly through a filter K4 of spaced inwardly hollow troughs for impactively catching dust and intermediate inwardly hollow troughs for suctionally extracting dust from the inflowing current which then rises in the passage $i4$ toward the deflectors $d4$ and $e4$ which deflect particles in to the grit passage $j4$ from which they descend through the filter troughs. The current curves inwardly around the top of the partition $o4$ and descends and flows inwardly through a second similar filter K4 passing under the inner depending wall $c4$ within which it rises past an adjustable flaring bellows partition $h4$ toward reverse deflectors Q4 which deflect particles from it downwardly in to the grit passage R4 from which they escape through the adjacent filter troughs. The current flows inwardly under the inner opening of the deflector Q4 through a third similar filter K4 and rises in a central passage X4 from which it flows outwardly to a fourth similar filter K4 and escapes through the usual vent pipe Y4. Vanes $a4$ slice relatively clean air from the inner part of that whirling in the drum A4 and direct it toward the center of the hollows of the troughs of the first filter K4.

In the modification shown in Figs. 9 and 10 the stationary inner wall V5 encloses the top edge of the adjacent transverse wall or baffle $h5$ so as to afford a uniform outlet passage from the selecting chamber to the outlet, and the adjustable valve Q5 is above the outlet opening and is lowered to contract it, and carries a bottom plate or wall L5 which moves with the valve Q5 and serves as a bottom wall for the passage from the selecting chamber to the fan.

In this construction the fan is constructed with an adjustable top wall F5 between its vanes which can be raised or lowered to vary the capacity of the fan and a vertically variable throat wall or valve N5 is provided which can be raised or lowered to correspond with the adjustment of the top wall F5 of the fan, to preserve proper relation between the outlet through the throat and the effective outlet through the fan.

The wall V5 is fixedly carried by the wall G5 to the inner chamber, and the baffle h5 is adjustably carried thereby in this construction.

What I claim is:

1. In combination, in a separator, a casing having a circular wall affording a separating chamber and having a current inlet and a current passage and a current outlet and a lower coarse material outlet, supply means for supplying material to be separated to said chamber, blower means for causing a fluid current to enter said chamber through said inlet and flow through said passage and through said current outlet to float fine material from said chamber, and a conical material outward conveyor wall below and extended substantially across said inlet and affording a bottom wall for said passage, for upwardly directing such current toward said inlet and outwardly conveying unseparated material below said inlet, and a material retainer shelf around said conical wall for receiving and sustaining below the path of such current such material for permitting such current to float fine material from such sustained material to said current outlet and having an outer edge spaced from the wall of said chamber and affording around such outer edge a coarse material discharge passage for discharging coarse material from said chamber toward said coarse outlet.

2. In combination, in a separator, a casing affording a separating chamber and having a current inlet and a current passage and a current outlet and a coarse material outlet, supply means for supplying material to be separated to said chamber, blower means for causing a fluid current to enter said chamber through said inlet and flow through said passage and through said outlet to float fine material from said chamber, and a material sustainer annular trough shaped wall below said supplying means for receiving and sustaining such material and around and adjacent and spaced from said current inlet, adjacent to the path of such current for permitting such current to float fine material from such sustained material to said current outlet and affording around the outer edge of said wall a coarse material passage for permitting coarse material to pass around said wall to said coarse outlet.

3. In combination, a casing enclosing a chamber having a lower current inlet opening and an upper current outlet, blower means for causing a fluid current to flow inwardly through said lower opening and up through said chamber and through said outlet to float fine material from said chamber, material precipitator means for supplying pulverulent material to be separated in said chamber, material rotary uptossers spaced below said lower inlet, and revolving in the path of such material precipitated through said lower inlet for uptossing such material across the path of such current flowing toward said lower inlet, for permitting such current to float fine material toward said lower inlet, and a downwardly and outwardly extended deflector wall above and adjacent said lower inlet and without and around said casing and in juxtaposition to said uptossers, for intercepting such uptossed material and downwardly deflecting across such current coarse particles uptossed by said uptossers.

4. In combination, a casing enclosing a separating chamber and having a lower current inlet opening and an upper outlet, blower means for causing a fluid current to flow inwardly of said chamber through said lower opening and up through said chamber and said outlet to float fine material from said chamber, supply means for supplying pulverulent material to be separated to said chamber, material sustainer shelf means below the zone of such inflowing current and below said lower opening for receiving and sustaining such material precipitated through said opening, material uptosser means below said lower opening for tossing such precipitated material upwardly across the zone of such inflowing current upwardly of said lower opening, and adjustable particle deflector means above the zone of such inflowing current and without and around said lower opening for intercepting such uptossed material and deflecting coarse particles thereof from said lower opening.

5. In combination, a casing enclosing a separating chamber and having a lower current inlet opening and an upper outlet, blower means for causing a fluid current to flow inwardly of said chamber through said lower inlet and up through said chamber and said outlet to float fine material from said chamber, material precipitator supply means for supplying pulverulent material to be separated to said chamber, material uptossers spaced a substantial distance below said precipitator means for tossing such precipitated material upwardly across the zone of such current, and reversely flared particle deflector means above and spaced in juxtaposition to said tossing means to intercept such uptossed material and deflect coarse particles thereof laterally of and downwardly through such returning current.

6. In combination, a casing enclosing a circular separating chamber having a current inlet and a central current outlet, said casing having side walls around said chamber for enclosing said chamber and an annular inwardly extended cover around said outlet for defining said central outlet, blower means in communication with said chamber for causing a fluid current to flow through said chamber and through said outlet to separate and float fine material from said chamber, a central distributor disposed centrally within said chamber, for distributing centrally within said chamber material to be separated and floated through said chamber by such current, and spaced concentric inner and outer walls within and in spaced relation to said casing, between said inlet and said outlet, which concentric walls form between them an annular current passage in communication from said inlet toward said cover, and which outer concentric wall forms between it and said casing a relatively currentless chamber around said separating chamber, said inner concentric wall having an edge opposite and adjacent and spaced from said cover, for affording past said edge a lateral passage for such current from around said inner wall to said outlet, and said outer concentric wall having an edge opposite and adjacent and spaced from said cover, for defining past said edge a lateral particle passage in communication past said edge between said separating chamber and said relatively currentless chamber, said cover having an annular conical wall opposite and spaced from said edges of said concentric walls, for receiving impingement of particles projected between said concentric walls toward said cover, and for deflecting such particles laterally of said concentric walls into said currentless chamber.

7. In combination, a casing enclosing a chamber having a current inlet and a central current outlet, said casing having side walls around said chamber and an inwardly inclined annular cover around said central outlet, blower means for causing a fluid current to enter said chamber through said inlet and flow through said chamber and said outlet to separate and float fine material from said chamber, central supply means within said chamber, for supplying material to be separated by such current, and inner and outer concentric spaced walls within and in spaced relation to said casing, between said inlet and said outlet, which concentric walls form between them an annular current passage in communication from said inlet toward said cover, said inner wall having an edge adjacent and spaced from said inclined cover, which edge forms past said edge a lateral current passage in communication with said outlet, and which outer concentric wall forms around it and within such outer casing a relatively currentless chamber for receiving separated particles, said outer concentric wall having an edge adjacent and spaced from said inclined cover, which edge of said outer concentric wall forms a lateral passage in communication from said separating chamber to said currentless chamber, for laterally passing separated particles from said chamber to said currentless chamber, said inclined cover being opposite said edges, for receiving impingement of particles projected through said current passage toward said cover and for laterally deflecting such particles into said currentless chamber.

8. In combination, a casing enclosing a circular chamber having a current inlet and a central current outlet, said casing having side walls around said chamber and an annular cover around said central outlet having reversely inclined annular inner faces, blower means in communication with said chamber for causing a fluid current to flow through said inlet and through said chamber and through said outlet to separate and float fine material from said chamber, central supply means within and concentric of said chamber, for supplying material to be separated therein by such current, and a plurality of spaced concentric walls within and concentric of said chamber and in spaced relation to said side walls and such inner cover, between said inlet and said outlet, and opposite and adjacent and spaced from said cover, which concentric walls form between them an annular current passage in communication from said inlet toward said cover, for passing such current from said inlet toward said cover, and which outer concentric wall forms around it within said casing a relatively currentless chamber, for receiving separated material, said inner concentric wall having an edge opposite and spaced from said cover, which edge forms past it a lateral passage in communication from said current passage to said central outlet, for pressing said current to such outlet, and said outer concentric wall having an edge adjacent and spaced from said cover, which edge of said outer concentric wall forms past it a lateral passage in communication from said separating chamber to said currentless chamber, for passing separated particles from said separating chamber to said currentless chamber, said concentric walls being opposite said inclined portion of said cover, for projecting particles floating in such current toward said inclined portion, for deflecting unseparated particles past the edge of said outer concentric wall and for deflecting such particles around said outer concentric wall.

GEORGE HOLT FRASER.